Figure 1:
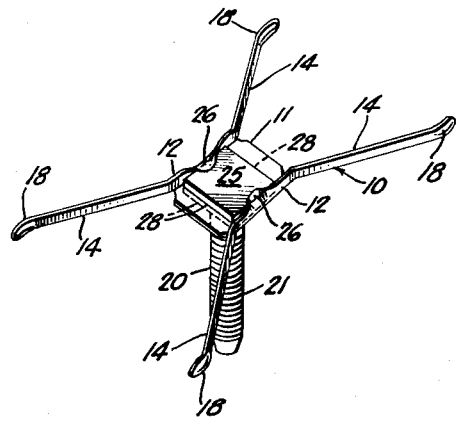

May 11, 1954

L. H. FLORA 2,677,862

MOLDING CLIP

Filed July 3, 1952

INVENTOR
LAURENCE H. FLORA

BY H. L. Lombard

ATTORNEY

Patented May 11, 1954

2,677,862

UNITED STATES PATENT OFFICE 2,677,862

MOLDING CLIP

Laurence H. Flora, Cleveland, Ohio, assignor to Tinnerman Products, Inc., Cleveland, Ohio, a corporation of Ohio Application July 3, 1952, Serial No. 297,025

1 Claim. (Cl. 24—73)

This invention relates generally to clips or fasteners for securing moldings, trim strips, and the like, onto a supporting part and deals, more particularly, with an improved construction for molding clips or fasteners which are adapted to secure various sizes of moldings in different widths.

In most instances, the construction of a molding clip or fastener is such that it is suitable for use only with a molding or trim strip of one width or size, and accordingly, a complete line of clips in different sizes must be provided for moldings of various widths or sizes. In the use of a molding clip or fastener suitable for securing various sizes of moldings in different widths, considerable savings and important advantages are involved inasmuch as only a single set of dies is required for making the clips and there is no problem of stocking and cataloging various sizes of clips. Moreover, manufacturing variations and inconsistencies frequently develop in the production of the moldings, particularly when made of plastic, such that the inner walls of the moldings are not always precise and uniform throughout their lengths. Consequently, in the use of molding clips or fasteners suitable only for a specific size of molding and which must fit precisely within the inner wall of the molding, there are usually several clips in an installation which are so loosely connected to the molding that the molding is not secured properly with complete effectiveness in the manner intended.

It is, therefore, a primary object of this invention to provide an improved molding clip or fastener in a simplified sheet metal construction comprising a body portion having an outwardly bent flexible strip, or the like, on its opposite sides defining opposing elongate spring arms which extend lengthwise in connected relation with a molding and yieldable transversely thereof so as to be automatically adjustable for connection to moldings of various widths and otherwise adapted for effective, proper connection to moldings of a standard size despite manufacturing variations and irregularities in the formaton of the moldings.

Another object of the invention is to provide such a molding clip or fastener in which said elongate resilient spring arms extend lengthwise of the molding and yieldable transversely thereof, and define relatively wide bearing surfaces adapted for positive surface engagement with opposite surface portions of the inner wall of the molding under continuously effective spring tension.

A further object of the invention is to provide an improved molding clip or fastener, as aforesaid, in which the body of the clip is provided in a relatively large generally H-shaped formation comprising opposing elongate resilient spring arms having surface portions that are yieldable transversely toward and from each other for engagement with opposite inner wall portions of various sizes of moldings of relatively large cross section.

Figure 2:
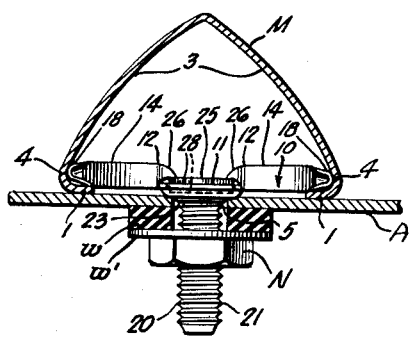

Further objects and advantages of the invention, and other new and useful features in the construction, arrangement and general combination of elements and features of the molding clip of the invention will be readily apparent as the following description proceeds with reference to the accompanying drawings, for purposes of illustration but not of limitation, in which like reference characters designate like parts throughout, and in which:

Fig. 1 is a perspective view showing one form of the molding clip or fastener of the invention as provided in an assembly comprising a sheet metal body and a bolt, screw or stud connected therewith providing the shank of the clip or fastener; and, Fig. 2 is a vertical sectional view transversely of a molding installation in which the molding clip or fastener of Fig. 1 is shown as employed to secure a molding on an apertured supporting part.

Figure 4:
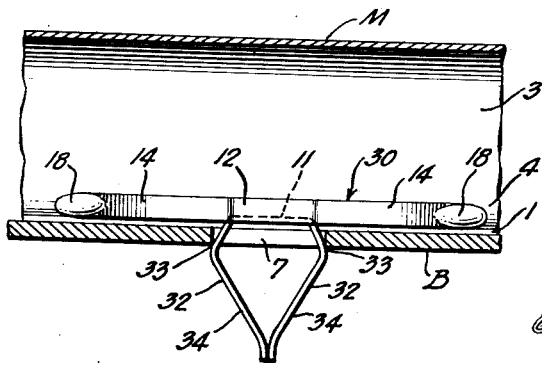
Figure 3:
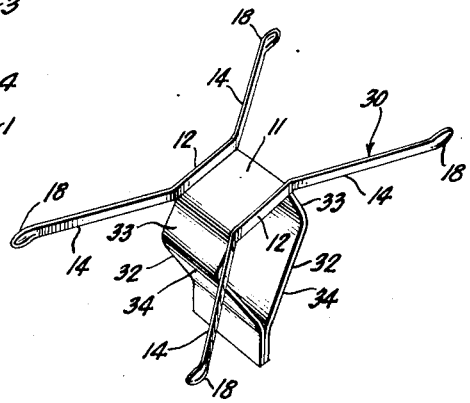

Fig. 3 is a perspective view of another form of molding clip or fastener provided as a one-piece sheet metal device having an integral shank adapted for snap fastening engagement in an aperture in a supporting part; and, Fig. 4 is a vertical sectional view longitudinally of a molding assembly in which the fastener of Fig. 3 is employed to secure a molding in attached position on an apertured supporting part.

For purposes of illustration, the improved molding clips of the invention are shown as used in connection with a molding M of a type commonly used in automobile body decoration wherein the molding comprises an elongate, hollow rolled length of sheet metal having similar inturned flanges 1 along its lateral margins. The outer surface of the molding M is suitably decorative and the interior of the molding is in the nature of a hollow channel-shaped wall 3 having rounded surface portions at the corners 4 thereof adjacent said inturned flanges 1.

The molding clip or fastener 10, Figs. 1 and 2, is constructed from a sheet metal blank which is stamped to define a central body portion in the form of generally rectangular base 11 having integral side strips 12 extending lengthwise of said base or body portion 11 and upturned or bent outwardly out of the plane of the upper surface of said base 11 in the manner of longitudinal ribs, or the like. These integral side strips 12 include elongate extensions which project beyond the ends of the base 11 for any desired length and thereby define pairs of opposing spring arms 14 extending from each end of said base or body portion 11. It will be understood that the side strips 12 including the extensions thereon defining said spring arms 14, are integral portions of the blank and initially are in the plane of the base 11. When said side strips 12 are upturned or bent outwardly out of the plane of said base 11 substantially in normal relation thereto, said extensions 14 have their flat surfaces disposed in opposing face to face relation. The spring arms 14, thus provided, are in the nature of pairs of spaced, opposing elongate flexible leaf springs having their flat surfaces in opposing face to face relation and bent laterally outwardly from each other in suitable diverging relation, substantially as shown in Fig. 1.

Important advantages are involved in thus providing said pairs of spring arms 14 with their surface portions in opposing face to face relation in that said spring arms are thereby adapted to move readily inwardly and outwardly with respect to each other to seat properly and effectively in connected relation with moldings of different widths, and otherwise compensate for any manufacturing variations in a supply of moldings in a specific size as provided in mass production methods of assembly. In addition, in providing said spring arms 14 with their flat surfaces in opposing face to face relation, the flat surfaces on the ends of said spring arms are admirably suited to be formed into bearing portions having a curved or other formation corresponding to the contour of the inner surface portions of the wall of the molding M which they engage so as to seat firmly and rigidly in connected relation with the molding under spring tension, thereby eliminating any loose fit of the clip within the molding which could result in a faulty assembly or squeaks, rattles and other annoying sounds in a completed installation. In the present example, the flat surfaces on the end portions of said spring arms 14 are stamped with outward bosses or protuberances 18 which fit snugly within the rounded corner portions 4 of the molding M. As seen in Fig. 2, the rounded surfaces of said bosses 18 have the same general contour as the rounded surfaces of said corners 4 of the molding whereby said bosses 18 are in bearing engagement therewith over a relatively wide area to provide a firm and rigid connection of the spring arms 14 with the molding in the most effective manner. In the diverging relation of the pairs of opposing spring arms 14, such diverging relation is such that the bosses 18 on each pair of diverging arms are normally spaced apart a distance greater than the space between said corners 4 of the molding. Each pair of diverging spring arms 14, therefore, must be compressed toward each other in a manner whereby said bosses 18 thereon seat against the rounded surfaces of said corners 4 of the molding M under the expansive spring force set up in each pair of spring arms 14 in compressed relation toward each other.

In the form of the invention shown in Figs. 1 and 2, the shank of the clip is provided by a suitable bolt, screw or other stud 20 connected to the base or body portion 11 of the clip and having a shank 21 projecting from the undersurface thereof. In the preferred highly simplified construction, the shank 21 of the bolt or screw 20 extends through a central passage 23, Fig. 2, in the base 11 of the clip, and has a generally rectangular head 25 of slightly less width than the width of the space between the upturned or outwardly bent side strips 12 so that the side edges of said head 25 seat in abutting relation with said side strips 12 to prevent turning of said head 25 of the bolt relative to the base or body portion 11 of the clip. The head 25 of the bolt is relatively thin and of less thickness than the height of said upturned side strips 12. Accordingly, in the assembled relation of said bolt head 25 on the base 11 of the clip, the outer or upper edges of said side strips 12 extend beyond the outer surface of said bolt head 25 and are crimped over the bolt head 25 into inwardly extending tabs or tongues 26 which retain the bolt 20 in permanently assembled relation with the base or body 11 of the clip substantially as shown in Fig. 1. The completed form of clip 10 preferably is provided with added resistance against turning and rotation of the bolt head 25 relative to the base 11 of the clip by forming a depression in said base 11 in which the underside of said bolt head 25 is seated. The depression in the base 11 provides a pair of spaced shoulders 28 which abut the ends of the bolt head 25 in cooperation with the side strips 12 in abutting relation with the sides of said bolt head 25. Accordingly, both sides and ends of the bolt head 25 are retained by abutments at four points around the periphery of said bolt head 25 in a manner which positively prevents any possible rotation of the bolt head 25 relative to the base or body 11 of the clip. This, of course, is important in the application of a cooperating nut N, Fig. 2, to the bolt shank 21 during which said bolt shank 21 must be held against turning with the nut N as said nut is tightened in order to insure a tight and effective installation which is not subject to loosening or displacement.

In completing an installation of a molding M substantially as shown in Fig. 2, it will be understood that as many of the clips or fasteners 10 as are necessary or desirable are attached to the molding M at spaced points along the length thereof. Each of the clips 10 is easily and quickly attached to the molding simply by positioning the spring arms 14 of the clip lengthwise of the molding M adjacent the space between the inturned flanges 1 thereof with the shank 21 of the bolt projecting from the underside of said molding. The pairs of diverging spring arms 14 are readily compressed toward each other as necessary for the bosses 18 on the extremities thereof to pass within the space between said inturned flanges 1 whereupon said spring arms 14 expand and seat said bosses 18 thereon in the rounded corners 4 of the molding M in connected relation therewith, as aforesaid.

The molding M is then ready to be applied to the supporting part A which is prepared with a suitable number of stud receiving openings 5 along the path which said molding extends in mounted position thereon and with said openings 5 having a predetermined spacing corresponding to the spacing of the shanks 21 of the clips 10 in attached position on the molding M. The supporting part A may be of suitable metal, wood or fibre board construction but usually is in the form of a metallic plate or panel A which is readily provided with said openings 5 in a simple punching or drilling operation. The shank 21 of each clip 10 is inserted into its respective opening 5 of the plate or panel A to project from the underside thereof where it is secured in the usual manner by a nut N together with suitable washers w, w', to complete the installation of the molding, substantially as shown in Fig. 2.

Figs. 3 and 4 show another form of molding clip or fastener 30 in which the base or body portion 11 including the spring arms 14 and bosses 18 thereon are provided in the same general construction for attachment in connected relation with the molding M in a manner similar to that described with reference to Figs. 1 and 2. In this form of the invention, the clip 30 is provided as a one-piece device with the shank formed from integral portions of the blank to define a stud adapted for snap fastening action in the panel opening 7 in the supporting part B. In a preferred construction of this character, the base or body portion 11 is provided with integral portions defining legs 32 on each end thereof between the pairs of spaced spring arms 14. These leg portions 32 are bent to project from the undersurface of the base or body portion 11 and are formed with outwardly diverging cam shoulders 33 merging into inwardly converging, wedge-shaped guide surfaces 34 extending to the free ends of said leg members 32 which preferably are in abutting relation at the point of the shank to add stiffness to said legs 32 and rigidity to the shank thus provided.

The clips 30 are attached in connected relation with the molding M in the same way with the shank of each clip defined by the leg portions 32 projecting from the underside of said molding M. In mounting the molding, the projecting shank of each clip 30 is readily entered into its associated opening 7 in the panel B or other support inasmuch as said legs 32 preferably taper to a point which is much smaller than the size of the panel opening 7.

Axial pressure is then applied to the top of the molding M in the area of the head of each clip to move the shank 32 of the clip axially into the panel opening 7, whereupon the inclined guide surfaces 34 on said legs 32 cam against the marginal edges of the panel opening 7 to cause a gradual contraction of said legs 32 as necessary for the same to pass through said opening 7 to a position in which the cam shoulders 33 spring outwardly into engagement with the marginal portion of said panel opening 7, substanitally as shown in Fig. 4. Preferably said shoulders 33 are provided in the form of diverging cam surfaces, as shown, which are adapted to ride on the lower corner edge of the panel opening 7 and automatically seat in fastening engagement with such lower corner edge of the panel opening 7 in the most effective manner even though the marginal portion of the panel opening may not be of proper thickness or has some slight irregularity. In addition, such shoulders 33 in the form of cam surfaces adapt the clip for effective application to panels of different thicknesses within limits, and otherwise provide a suitable axial drawing action on the clip shank which pulls the molding tightly against the supporting panel B in mounted position. Inasmuch as the generally H-shaped head portions of the clip defined by the cooperating pairs of spring arms 14 are firmly interlocked with the molding flanges 1, as aforesaid, there is no tendency for the clips to become displaced from attached position with the molding during the operation of forcing each clip shank 32 through its panel opening 7. Accordingly, the shank legs 32 of each clip are readily compressed in tensioned locking engagement in its panel opening 7 without disturbing the rigid engagement of the spring arms 14 in connected relation with the molding M.

The base or body portion 11 of the clip of Figs. 1 and 2 and the complete fastener of Figs. 3 and 4 are constructed of relatively thin sheet metal, the thickness of which is selected according to service requirements and the predetermined size of the molding or similar part to be secured. The fasteners are most effective when provided of spring metal suitably tempered and otherwise treated to give the desired toughness and hardness. A cheap but effective fastener may be provided from cold rolled metal, such as cold rolled steel, which is untempered but of a spring metal nature and capable of providing an effective and reliable clip or fastener for a molding installation or the like, in accordance with the invention.

While the invention has been described in detail with specific examples, such examples are intended as illustrations only, inasmuch as it is quite apparent that other modifications in the construction, arrangement and general combination of parts and elements of the invention may be provided without departing from the spirit and scope of the invention.

What is claimed is:

A clip for a molding, or the like, comprising a piece of sheet metal providing a base and integral longitudinal side strips on opposite sides of said base, said side strips including longitudinal extensions projecting beyond the opposite ends of said base, said side strips being bent outwardly from the outer surface of said base such that said extensions define a pair of opposing spring arms projecting beyond each end of said base and having surface portions in face to face relation, each pair of said opposing spring arms extending in diverging relation away from said base and said surface portions thereon being yieldable toward and from each other transversely of said base for engagement with opposite surface portions of the inner wall of said molding, or the like, said base having a depression between said side strips defining spaced shoulders and being provided with a passage in said depression, and a headed stud having its shank extending through said passage and projecting from the undersurface of said base with the head of said stud seated in said depression and having its ends in abutting relation to said shoulders defined by said depression and its sides in abutting relation to said outwardly bent side strips on said base.

References Cited in the file of this patent

UNITED STATES PATENTS

| Number | Name | Date |
|---|---|---|
| 2,133,837 | Wiley | Oct. 18, 1938 |
| 2,154,711 | Van Uum | Apr. 18, 1939 |
| 2,214,150 | Van Uum | Sept. 10, 1940 |
| 2,221,124 | Wiley | Nov. 12, 1940 |
| 2,249,902 | Kral | July 22, 1941 |
| 2,295,449 | Churchill | Sept. 8, 1942 |
| 2,346,712 | Tinnerman | Apr. 18, 1944 |
| 2,515,895 | Poupitch | July 18, 1950 |
| 2,521,354 | Flora | Sept. 5, 1950 |
| 2,626,772 | Flora | Jan. 27, 1953 |